United States Patent
Adams et al.

Patent Number: 5,119,689
Date of Patent: Jun. 9, 1992

[54] DEVICE FOR ADJUSTING BOWDEN CABLES

[75] Inventors: Gerd Adams, Leichlingen; Guido de Crouppe, Frechen, both of Fed. Rep. of Germany

[73] Assignee: Ford Motor Company, Dearborn, Mich.

[21] Appl. No.: 733,918

[22] Filed: Jul. 22, 1991

[30] Foreign Application Priority Data

Aug. 11, 1990 [DE] Fed. Rep. of Germany ........ 4025529

[51] Int. Cl.⁵ ................................................. F16C 1/10
[52] U.S. Cl. .................................. 74/502.5; 403/118; 403/348
[58] Field of Search .................. 74/500.5, 502.4, 502.5, 74/502.6; 403/118, 348

[56] References Cited

U.S. PATENT DOCUMENTS

| | | | |
|---|---|---|---|
| 4,324,503 | 4/1982 | Sevrence | 403/197 |
| 4,658,668 | 4/1987 | Stocker | 74/501.5 R |
| 4,669,330 | 6/1987 | Stocker | 74/501.5 R |
| 4,694,706 | 9/1987 | Lichtenberg et al. | 74/501.5 R |
| 4,869,123 | 9/1989 | Stocker | 74/501.5 R |
| 4,903,541 | 2/1990 | Shiota | 74/501.5 R |
| 5,039,138 | 8/1991 | Dickirson | 285/314 |

FOREIGN PATENT DOCUMENTS 0338450 10/1989 European Pat. Off. .
2638212 2/1978 Fed. Rep. of Germany .

*Primary Examiner*—Richard Lorence
*Assistant Examiner*—William O. Trousdell
*Attorney, Agent, or Firm*—Frank G. McKenzie; Roger L. May

[57] ABSTRACT

A device for adjusting and holding the length of a Bowden cable includes a supporting sleeve, which supports a sheath end-piece for axial sliding movement but prevents rotation. External threads formed on the outer surface of the sheath end-piece are engaged by corresponding teeth on the inner surface of a locking sleeve, which is rotated about the longitudinal axis of the device to engage and disengage the teeth. A ribbed actuating sleeve engages cogs on the outer surface of the locking sleeve to facilitate rotation. When the teeth are engaged, the length of the cable is releasably fixed.

11 Claims, 3 Drawing Sheets

DEVICE FOR ADJUSTING BOWDEN CABLES

BACKGROUND OF THE INVENTION

1. Field of the Invention

This invention relates to a device for adjusting the length of a cable that transmits linear displacement of an actuator to a controlled component.

2. Description of the Prior Art

Patent document EP-OS 338,450 describes a device for adjusting Bowden cables. The device includes a stationary abutment surface contacted by a supporting sleeve, which slidably and nonrotatably receives a sheath end-piece and is connected to a locking sleeve having an internal locking surface. The locking surface meshes with teeth formed on the outer surface of the sheath end-piece as a result of its rotation relative to the supporting sleeve, thereby fixing the effective length of the sheath.

This adjusting device has the disadvantage that the locking sleeve connected to the supporting sleeve rests against the stationary abutment surface only when pressure is applied. Consequently, it can lift from the abutment surface if a tensile load acts on the Bowden cable sheath. Furthermore, the connection between the supporting sleeve and the locking sleeve, made by means of a multiple-coil spring, is relatively complex and insecure.

U.S. Pat. No. 4,869,123 describes a cable length adjuster in which a square slider passes through a housing, which supports a latch and a leaf spring urging the latch toward the slider. The latch has teeth suited to engage teeth on a flat surface of the slider. The adjuster is self-locking and has no provision for manually rotating the latch into position to engage the slider.

U.S. Pat. No. 4,669,330 describes a cable length adjuster having a pivoting threaded square slider connected to a Bowden cable. The slider passes through a housing having threads formed on an inner surface adapted to engage the slider threads when the slider is pivoted into alignment with the housing axis. This pivoting action results from rotating a lever that forces the parts into alignment against the force of a coiled spring.

The housing of the cable adjuster described in U.S. Pat. No. 4,658,668 includes an axial hole through which a threaded slider connected to the cable passes. When the cable length is to be fixed by the adjuster, a latch supported on the housing slides in a recess laterally into engagement between threads of the slider, thereby locking the housing and slider against relative movement induced by a coiled spring.

SUMMARY OF THE INVENTION

An object of this invention is to provide an improved Bowden cable adjusting device that produces a connection, secure in a tension direction and in a pressure direction, between a stationary abutment surface and a supporting sleeve. The adjusting device of this invention produces a simpler connection between the supporting sleeve and the locking sleeve than those of the prior art.

The supporting sleeve is connected to the abutment surface in an axially-fixed, nonrotatable manner by means of two axially extending arms. An annular locking sleeve is inserted in a radial direction between the arms so that it is aligned axially with the supporting sleeve, which can be rotated about a central axis relative to the supporting sleeve, by means of radially projecting cogs. Teeth protruding radially on the internal surface of the locking sleeve mesh with the teeth arranged on the external surface of the sheath end-piece to fix the axial position of the sheath end-piece.

The supporting sleeve is surrounded concentrically by an actuating sleeve, whose axially extending arm engages axially and radially rigidly with radial cogs on the locking sleeve. The locking sleeve is actuated simply and reliable by hand.

The locked position is maintained by engagement of radially directed knobs on the locking sleeve with recesses in the arms between the supporting sleeve and the abutment surface.

DESCRIPTION OF THE DRAWINGS

The invention is described in more detail with reference to an embodiment illustrated in the drawings.

DESCRIPTION OF THE PREFERRED EMBODIMENT

Figure 1:
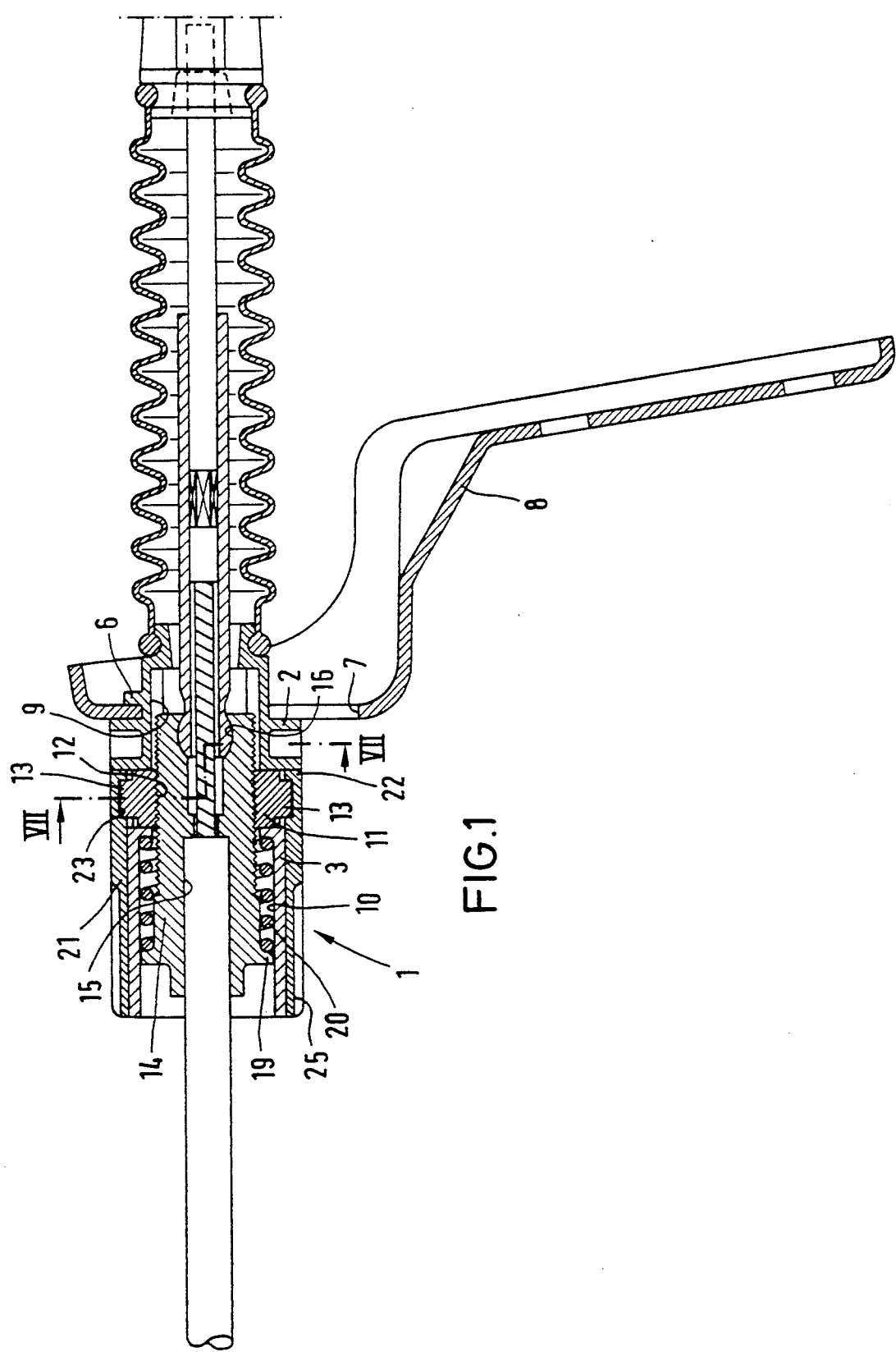
FIG. 1 is a cross section through the longitudinal axis of a device for adjusting the length of Bowden cables according to the invention.
Figure 2:
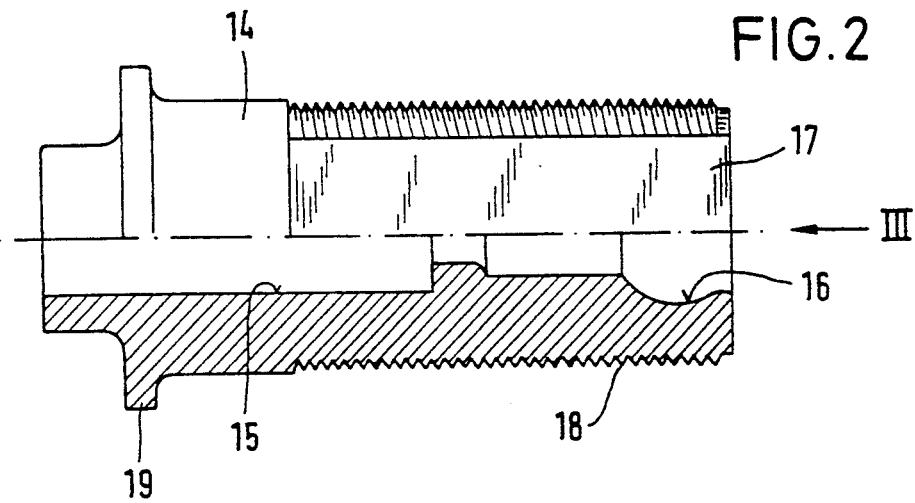
FIG. 2 is a side view partially in cross section of the sheath end-piece of the Bowden cable adjuster of FIG. 1.
Figure 3:
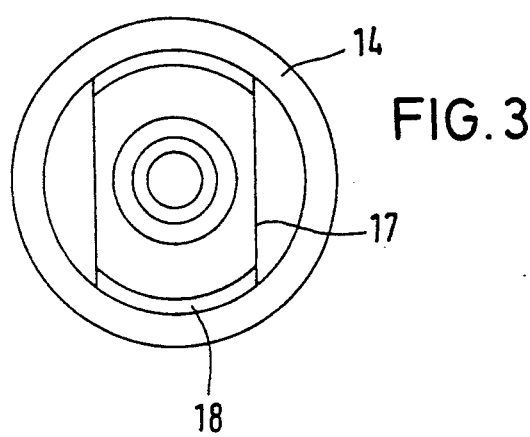
FIG. 3 is a end view taken in direction III in FIG. 2.
Figure 4:
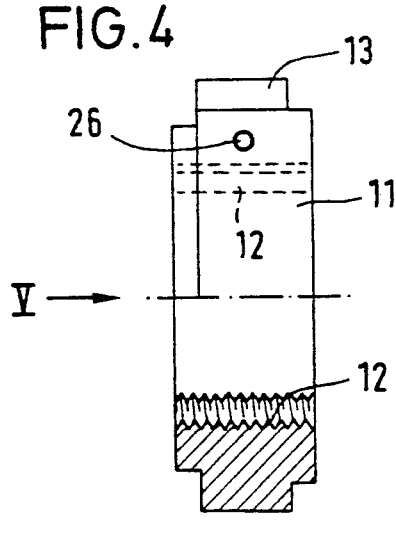
FIG. 4 is a side view partially in cross section of the locking sleeve.
Figure 5:
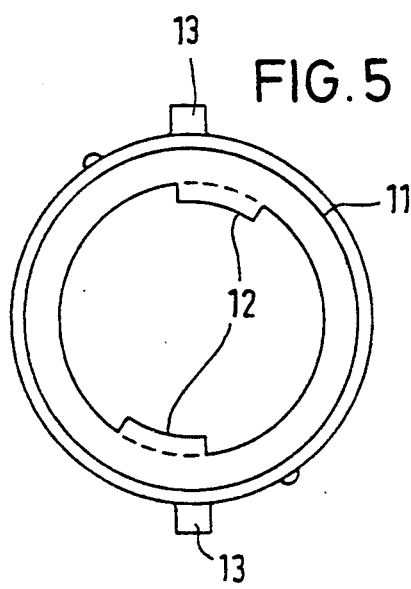
FIG. 5 is an end view of the locking sleeve taken in direction V in FIG. 4.
Figure 6:
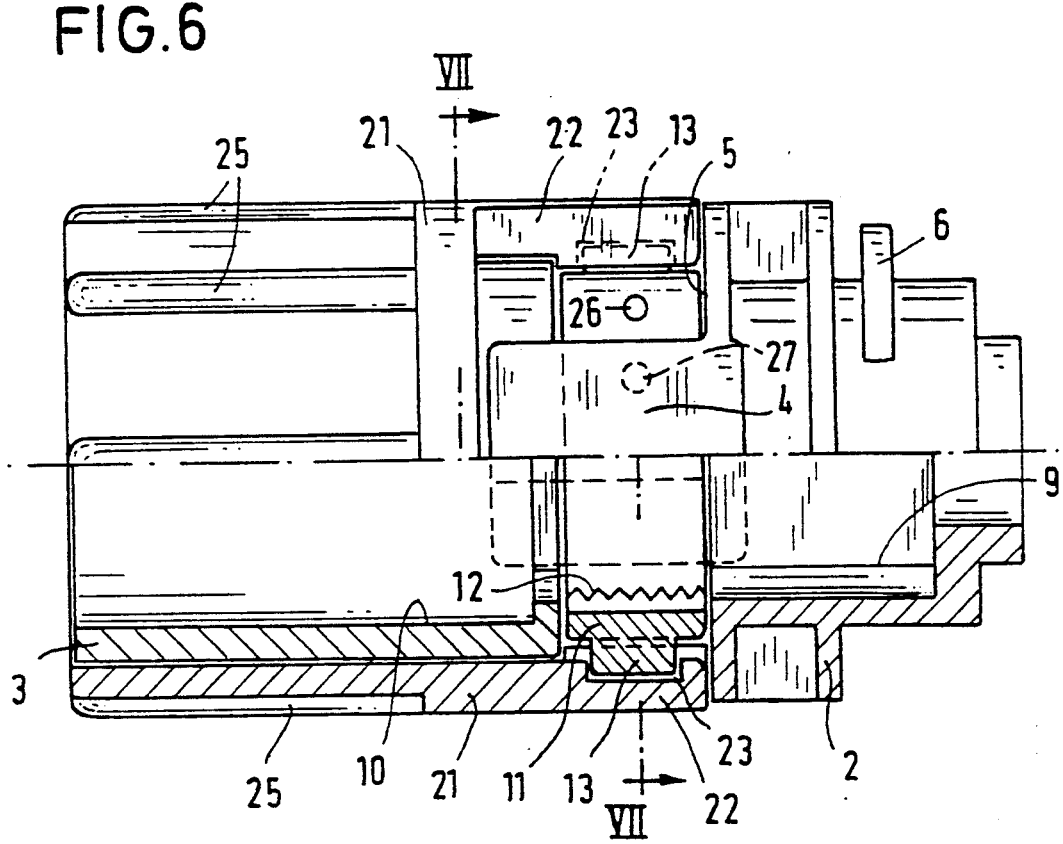
FIG. 6 is a side view partially in cross section of the supporting sleeve, locking sleeve and actuating sleeve.
Figure 7:
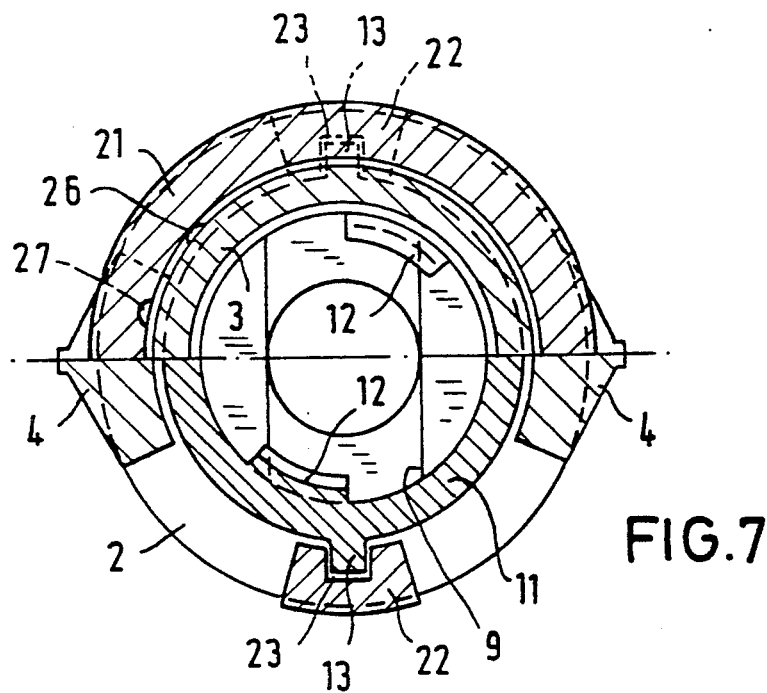
FIG. 7 is a cross section taken at plane VII—VII in FIG. 1.

FIG. 1 shows the assembled position of the components of a Bowden cable adjuster according to the present invention. The adjusting device 1 includes an abutment part 2 and a supporting sleeve 3, the sleeve and the abutment part being connected by axially extending arms 4 to form a unitary component (seen best in the side view of FIG. 6) having a relatively wide opening 5 that extends transversely to the central axis.

The subassembly formed of the abutment part and supporting sleeve 2, 3 includes a mounting flange 6, spaced axially from another radially directed flange and defining between these flanges a space within which flange 7 of a holding bracket 8 becomes engaged. The supporting sleeve 3 has a polygonal opening 9 at one axial end and a circular opening 10, concentric with longitudinal axis, at the opposite axial end.

Annular locking sleeve 11 is inserted in a radial direction by elastic deformation of the sleeve sufficient to fit it through the transverse opening 5 in axial alignment with the abutment/supporting sleeve 2,3. The locking sleeve has inwardly protruding teeth 12 on angularly spaced portions of its internal periphery and radially outwardly projecting cogs 13 on its external surface. Cogs 13 are dimensioned so that they protrude into the transverse opening 5 so that they can be gripped manually to rotate the locking sleeve 11.

A sheath end-piece 14, connected to the sheath of a Bowden cable that extends through the adjusting device, has internal receiving openings 15, 16 that receive the Bowden cable sheath and the Bowden cable core, respectively. The lateral surfaces 17 of sheath 14 are planar and locking teeth 18, in two spaced segments, extend around angular by spaced portions of the inner surface of the end-piece between the sides 17. A preloaded compression spring 20 is located in an annular zone between a flange 19, formed near one axial end of sheath 14, and a flange formed on supporting sleeve 3. As the locking sleeve 11 is rotated manually, its teeth 12 alternately engage and disengage the teeth 18 of the end-piece.

According to a further embodiment of the invention, an actuating sleeve 21 surrounds a supporting sleeve 3 and includes axially extending arms 22, which overlap the transverse opening 5 in the abutment/ supporting sleeve 2,3. Catch recesses 23, formed on the inner surface of actuating sleeve 21, receive the radially projecting cogs 13, which are engaged on the locking sleeve 11 against axial and radial disPlacement. By gripping the external surface of actuating sleeve 21, which may be formed with axially directed ribbing 25 to facilitate manual rotation, locking sleeve 11 is rotated more simply and reliably within the transverse opening 5 relative to the abutment/supporting sleeve 2,3.

In the process of fitting the Bowden cable sheath in the adjusting device, opening 7 in holding bracket 8 is located in the space adjacent flange 6 of the abutting part 2. The sheath end-piece 14 slides axially over the abutment/supporting sleeve 2,3. The locking sleeve 11 is rotated about the longitudinal axis so that its internal teeth 12 are located adjacent the flattened side 17 on the sheath end-piece When the end piece moves sufficiently far through the locking sleeve 11, sleeve 11 is rotated relative to the abutment/ supporting sleeve by gripping the radial cogs 13 and turning the actuating sleeve 21. When this occurs, the internal teeth 12 on the locking sleeve 11 are brought into meshing engagement with the external teeth 18 on the sheath end-piece 14. The length of the Bowden cable sheath is then reliably fixed and held.

According to a further embodiment, small catching projections 26, which operate by engagement in catch recesses 27 on the axially extending arms 4 located between the abutment part 2 and the supporting sleeve part 3, are provided on the external surface of locking sleeve 11 adjacent the radial cogs 13. Engagement of projections 26 in recesses 27 hold the locked position of locking sleeve 11 against radial or axial movement.

Having described a preferred embodiment of our invention, what we claim and desire to secure by U.S. Letters Patent is:

1. A device for adjusting the length of a cable having a core enclosed in a sheath, comprising:
   a supporting sleeve having a first passage directed along the cable length;
   mounting abutment means for fixing a position where the device is attached against movement, connected to said supporting sleeve, having a second passage coaxial with the first passage and a transverse opening providing access to said passages;
   an endpiece fixed to the cable sheath for axial movement therewith, slidably mounted in the supporting sleeve, having teeth formed thereon;
   an annular locking sleeve surrounding the sheath endpiece, having teeth disposed to engage releasably the teeth of the sheath endpiece, means accessible through the transverse opening for moving the locking sleeve teeth into engagement with the endpiece; and
   a catch projection extending from the surface of the annular locking sleeve toward the mounting abutment means, the mounting abutment means has a recess facing the catch projection and adapted to receive the catch projection therein when the locking sleeve engages the supporting sleeve, thereby holding the angular position of the locking sleeve relative to the supporting sleeve when the teeth are engaged and releasing the locking sleeve from the supporting sleeve when the teeth are disengaged.

2. The device of claim 1 further comprising spring means for urging the endpiece along the cable length away from the supporting sleeve.

3. The device of claim 1 wherein the supporting sleeve and endpiece include axially spaced, radially extending flanges, the device further comprising compression spring means located between, and contacting said flanges for urging the endpiece along the cable length away from the supporting sleeve.

4. The device of claim 1 wherein the opening of the mounting abutment means is adapted to receive the locking sleeve therethrough in a transverse direction from without the device.

5. The device of claim 1 wherein the locking sleeve includes cogs extending radially outward from the cable, further comprising an actuating sleeve surrounding the supporting sleeve and extending along the cable length, having recesses located to receive the cogs therein, the recesses having surfaces adapted to contact the cogs and thereby to rotate the locking sleeve as the actuating sleeve is rotated about the axis of the cable.

6. The device of claim 1 wherein the locking sleeve includes cogs extending radially outward from the cable, further comprising an actuating sleeve surrounding the supporting sleeve and extending along the cable length, having recesses located to receive the cogs therein, the recesses having surfaces adapted to contact the cogs thereby to cause the actuating sleeve and locking sleeve to move rotatably and axially as a unit.

7. The device of claim 1 wherein the locking sleeve further comprises a catch projection extending from its surface toward the mounting abutment means, the mounting abutment means has a recess facing the catch projection and adapted to receive the catch projection therein when the locking sleeve engages the supporting sleeve, thereby holding the angular position of the locking sleeve relative to the supporting sleeve when the teeth are engaged and releasing the locking sleeve from the supporting sleeve when the teeth are disengaged.

8. A device for adjusting the length of a cable having a core enclosed in a sheath, comprising:
   first means for holding the device in position against movement, having a first passage directed along the cable length, and an opening providing access to said passage;
   second means fixed to the cable sheath for axial movement therewith, located in the first means for movement along the cable length, having first engageable means formed thereon;
   third means surrounding the second means, having second engageable means thereon for releasably engaging the first engageable means, means accessible through the opening for moving the second means into engagement with the third means;
   cogs extending radially outward from the cable; and
   fourth means surrounding the first means and extending along the cable length, having holding means for rotating the third means as the fourth means rotates about the axis of the cable.

9. The device of claim 8 further comprising spring means for urging the second means along the cable length away from the first means.

10. The device of claim 8 wherein the third means further comprises a catch projection extending from its surface toward the first means, the first means having a recess facing the catch projection and adapted to receive the catch projection therein when the third means engages the first means, thereby holding the angular position of the third means relative to the first means when the first engageable means are engaged and releasing the third means from the first means when the first engageable means are disengaged.

11. A method for releasably adjusting the length of a cable having a core enclosed in a sheath using a cable length adjuster that includes a sleeve having a central passage directed along the cable length, an opening providing access in a transverse direction to the passage and a mounting device for holding the adjuster against movement. an endpiece fixed to the cable sheath, moveable along the passage and having teeth formed thereon, and an annular locking sleeve surrounding the endpiece having teeth disposed to engage releasably the teeth of the endpiece when the teeth are aligned angularly, comprising the steps of:
 elastically deforming the locking sleeve;
 forming the locking sleeve through the opening;
 connecting the endpiece to the cable sheath;
 misaligning the teeth of the locking sleeve and the teeth of the endpiece;
 routing the cable and endpiece through the sleeve and mounting device;
 locating the cable and endpiece in the desired axial position within the sleeve; and
 rotating the locking sleeve relative to the endpiece so that the teeth of the locking sleeve and the teeth of the endpiece engage and hold the cable in position.

* * * * *